(12) United States Patent
Ningrat et al.

(10) Patent No.: US 10,120,514 B2
(45) Date of Patent: Nov. 6, 2018

(54) CAPACITIVE TOUCH PRESSURE SENSOR CONSTRUCTED FROM FLEXIBLE SUBSTRATE

(71) Applicant: STMicroelectronics Asia Pacific Pte Ltd, Singapore (SG)

(72) Inventors: Kusuma Adi Ningrat, Batam (ID); Giuseppe Noviello, Singapore (SG); John Serge Georges Nankoo, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 89 days.

(21) Appl. No.: 15/191,714

(22) Filed: Jun. 24, 2016

(65) Prior Publication Data

US 2017/0371442 A1    Dec. 28, 2017

(51) Int. Cl.
*G06F 3/044* (2006.01)

(52) U.S. Cl.
CPC .... *G06F 3/044* (2013.01); *G06F 2203/04102* (2013.01)

(58) Field of Classification Search
CPC .......... G06F 3/044; G06F 3/041; G06F 3/047; G06F 3/0414
See application file for complete search history.

(56) References Cited

U.S. PATENT DOCUMENTS

| 5,159,159 | A | 10/1992 | Asher | |
| 6,473,074 | B1* | 10/2002 | Okahashi | G06F 3/0414 |
| | | | | 178/18.01 |
| 7,030,860 | B1* | 4/2006 | Hsu | G06F 3/044 |
| | | | | 178/18.06 |
| 8,189,339 | B2 | 5/2012 | Mackey et al. | |
| 9,035,903 | B2* | 5/2015 | Binstead | G06F 3/041 |
| | | | | 345/174 |
| 9,599,451 | B2* | 3/2017 | Ullmann | G06F 3/044 |
| 2010/0139955 | A1* | 6/2010 | Long | G06F 3/044 |
| | | | | 174/257 |
| 2012/0193130 | A1* | 8/2012 | Fix | G06F 3/047 |
| | | | | 174/255 |
| 2014/0118637 | A1* | 5/2014 | Tanabe | G06F 3/044 |
| | | | | 349/12 |

* cited by examiner

*Primary Examiner* — Ricardo L Osorio
(74) *Attorney, Agent, or Firm* — Crowe & Dunlevy (57) ABSTRACT

An electronic device includes a flexible substrate. The flexible substrate includes a first portion having a plurality of first conductive lines formed thereon, a second portion having a plurality of second conductive lines formed thereon, and an intermediate portion mechanically coupling the first portion to the second portion. The intermediate portion is configured to permit folding so that the first and second portions can be arranged back-to-back or face-to-face such that plurality of the second conductive lines and plurality of first conductive lines are oriented so as to cross one another to thereby form a capacitive sensing panel. A single connector is mechanically coupled to the first portion or the second portion, and electrically coupled to the first portion and the second portion but not electrically coupling the first portion to the second portion.

19 Claims, 5 Drawing Sheets

CAPACITIVE TOUCH PRESSURE SENSOR CONSTRUCTED FROM FLEXIBLE SUBSTRATE

TECHNICAL FIELD

The present disclosure generally relates to capacitive touch pressure sensors, and, more particularly, to capacitive touch pressure sensors constructed from a flexible substrate in a footprint reducing fashion.

BACKGROUND

A touch screen display is a device that can detect an object in contact therewith or in proximity thereto. The touch screen display includes a display layer in association with a touch-sensitive matrix that can detect a location of a user's touch by way of a finger or stylus, for example. Touch screen displays are used in various applications such as mobile phones, tablets, and smartwatches. A touch screen display may enable various types of user input, such as touch selection of items or alphanumeric input via a displayed virtual keypad. Touch screen displays can measure various parameters of the user's touch, such as the location, duration, etc.

The display layer may also function in association with pressure-sensitive sensors that can detect the pressure exerted on the touch screen by the user's finger or by the stylus. The pressure-sensitive sensors may include, in a stacked arrangement, a matrix of conductive rows, a resilient dielectric layer, and a matrix of conductive columns. Mutual capacitances at the intersection of each row and column of the matrix may be sensed. These mutual capacitances change in value based on pressure exerted on the touch screen as a result of that pressure compressing the resilient dielectric layer and resultingly changing the distance between the matrix of conductive row and the matrix of conductive columns.

It is desirable for touch screen displays to be as thin as possible so as to save space within a desired device footprint for other components. While the touch screen display described above may provide for touch location sensing as well as touch pressure sensing, the resilient dielectric layer undesirably adds to the thickness in designs where both touch location sensors and touch pressure sensors are used. Accordingly, new designs for compact and thin pressure-sensitive sensors are needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device includes a flexible substrate. The flexible substrate includes a first portion having a plurality of first conductive lines formed thereon, a second portion having a plurality of second conductive lines formed thereon, and an intermediate portion mechanically coupling the first portion to the second portion. The intermediate portion is configured to permit folding so that the first and second portions can be arranged back-to-back or face-to-face such that plurality of the second conductive lines and plurality of first conductive lines are oriented so as to cross one another to thereby form a capacitive touch location sensing or capacitive touch pressure sensing panel. A single connector is mechanically coupled to the first portion or the second portion, and electrically coupled to the first portion and the second portion but not electrically coupling the first portion to the second portion.

The single connector may be mechanically coupled to the first portion, and conductive traces may run from the plurality of second conductive lines on the second portion, through the intermediate portion, and through the first portion to electrically couple to the single connector. In other instances, the single connector may be mechanically coupled to the second portion, and conductive traces may run from the plurality of first conductive lines on the first portion, through the intermediate portion, and through the second portion to electrically couple to the single connector.

The intermediate portion may have a maximum width less than a maximum width of the first portion and the second portion. The first portion may have a rectangular shape with sides and ends, with the sides of the first portion being longer than the ends of the first portion. The second portion may have a rectangular shape with sides and ends, with the sides of the second portion being longer than the ends of the second portion.

The intermediate portion may mechanically couple an end of the first portion to an end of the second portion. In other instances, the intermediate portion may mechanically couple a side of the first portion to a side of the second portion.

The single connector may be mechanically coupled to the second portion, and the flexible substrate may include conductive traces electrically coupled to the plurality of first conductive lines and running from the first portion, through the intermediate portion, through the second portion, and to the single connector. A path taken by the conductive traces through the second portion runs adjacent a perimeter thereof and is spaced apart from the plurality of second conductive lines.

In other instances, the single connector may be mechanically coupled to the first portion, and the flexible substrate may include conductive traces electrically coupled to the plurality of second conductive lines and running from the second portion, through the intermediate portion, through the first portion, and to the single connector. A path taken by the conductive traces through the first portion runs adjacent a perimeter thereof and is spaced apart from the plurality of first conductive lines.

The flexible substrate may be integrally formed as a monolithic unit. In some applications, a touch controller integrated circuit coupled to the single connector.

Another aspect is directed to a capacitive touch pressure sensor having a flexible substrate. The flexible substrate includes a first portion having a plurality of sense lines formed on a top face thereof, a second portion having a plurality of drive lines formed on a bottom face thereof, and an intermediate portion mechanically coupling the first portion to the second portion. The intermediate portion is U-shaped such that the bottom face of the second portion is opposed from the top face of the first portion. A resilient layer is disposed between the first portion and the second portion such that pressure applied to the second portion compresses the plurality of drive lines, thereby changing a distance between the plurality of drive lines and the plurality of sense lines. A connector is mechanically coupled to the first portion or the second portion, and electrically coupled to the plurality of sense lines and plurality of drive lines but not electrically coupling the plurality of sense lines to the plurality of drive lines.

A touch controller integrated circuit of the capacitive touch pressure sensor may be coupled to the single connector and configured to apply a driving signal to the plurality of drive lines, to sense changes in capacitances between intersections of the plurality of drive line and plurality of sense lines by measuring charge on the plurality of sense lines, and to determine the pressure applied to the second portion as a function of the changes in the capacitances.

The intermediate portion of the capacitive touch pressure sensor may have a maximum width less than a maximum width of the first portion and the second portion. The first portion may have a rectangular shape with sides and ends, with the sides of the first portion being longer than the ends of the first portion. The second portion may have a rectangular shape with sides and ends, the sides of the second portion being longer than the ends of the second portion. The intermediate portion may mechanically couple an end of the first portion to an end of the second portion.

The first portion of the capacitive touch pressure sensor may have a rectangular shape with sides and ends, with the sides of the first portion being longer than the ends of the first portion. The second portion may have a rectangular shape with sides and ends, with the sides of the second portion being longer than the ends of the second portion. The intermediate portion may mechanically couple a side of the first portion to a side of the second portion.

The first portion of the capacitive touch pressure sensor may have a rectangular shape with sides and ends, with the sides of the first portion being longer than the ends of the first portion. The second portion may have a rectangular shape with sides and ends, with the sides of the second portion being longer than the ends of the second portion. The single connector may be mechanically coupled to the second portion. The flexible substrate may include conductive traces electrically coupled to the plurality of sense lines and running from the first portion, through the intermediate portion, through the second portion, and to the single connector. A path taken by the conductive traces through the second portion may run adjacent a perimeter thereof and is spaced apart from the plurality of drive lines.

The first portion of the capacitive touch pressure sensor may have a rectangular shape with sides and ends, with the sides of the first portion being longer than the ends of the first portion. The second portion may have a rectangular shape with sides and ends, with the sides of the second portion being longer than the ends of the second portion. The single connector may be mechanically coupled to the first portion. The flexible substrate may include conductive traces electrically coupled to the plurality of drive lines and running from the second portion, through the intermediate portion, through the first portion, and to the single connector. A path taken by the conductive traces through the first portion may run adjacent a perimeter thereof and is spaced apart from the plurality of sense lines. The flexible substrate may be integrally formed as a monolithic unit.

A method aspect is directed to a method of making a touch screen. The method includes disposing a plurality of sense lines on a first portion of a flexible substrate, and disposing a plurality of drive lines on a second portion of the flexible substrate. The method further includes mechanically connecting a single connector to the first portion or the second portion, and electrically coupling the single connector to the plurality of drive line and to the plurality of sense lines, but not electrically coupling the plurality of drive lines to the plurality of sense lines. A resilient layer is disposed on the flexible substrate. The flexible substrate is bent about an intermediate portion such that the plurality of drive lines face the plurality of sense lines but are separated therefrom by the resilient layer.

The method may also include electrically coupling a touch controller integrated circuit to the single connector, and configuring the touch controller integrated circuit to apply a driving signal to the plurality of drive lines, to sense changes in capacitances between intersections of the plurality of drive line and plurality of sense lines by measuring charge on the plurality of sense lines, the changes in capacitance resulting from pressure applied to the second portion compressing the resilient layer and changing a distance between the plurality of sense lines and the plurality of drive lines.

The method may also include electrically coupling conductive traces to the plurality of sense lines and disposing the conductive traces so as to run from the first portion, through the intermediate portion, to the second portion, and to the single connector, along a path running adjacent a perimeter of the second portion and spaced apart from the plurality of drive lines.

The method may further include electrically coupling conductive traces to the plurality of sense lines and disposing the conductive traces so as to run from the second portion, through the intermediate portion, to the first portion, and to the single connector, along a path running adjacent a perimeter of the first portion and spaced apart from the plurality of sense lines.

Yet another aspect is that of a capacitive touch pressure sensor having a flexible substrate. The flexible substrate includes a first portion having a plurality of sense lines formed on a top face thereof, a second portion having a plurality of drive lines formed on a bottom face thereof, and an intermediate portion mechanically coupling the first portion to the second portion. The intermediate portion is U-shaped such that the bottom face of the second portion is opposed from the top face of the first portion. A dielectric layer is disposed between the first portion and the second portion. A connector is mechanically coupled to the first portion or the second portion, and electrically coupled to the plurality of sense lines and plurality of drive lines but not electrically coupling the plurality of sense lines to the plurality of drive lines.

A touch controller integrated circuit may be coupled to the single connector and configured to apply a driving signal to the plurality of drive lines, to sense changes in capacitances between intersections of the plurality of drive line and plurality of sense lines by measuring charge on the plurality of sense lines, and to determine the pressure applied to the second portion as a function of the changes in the capacitances.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
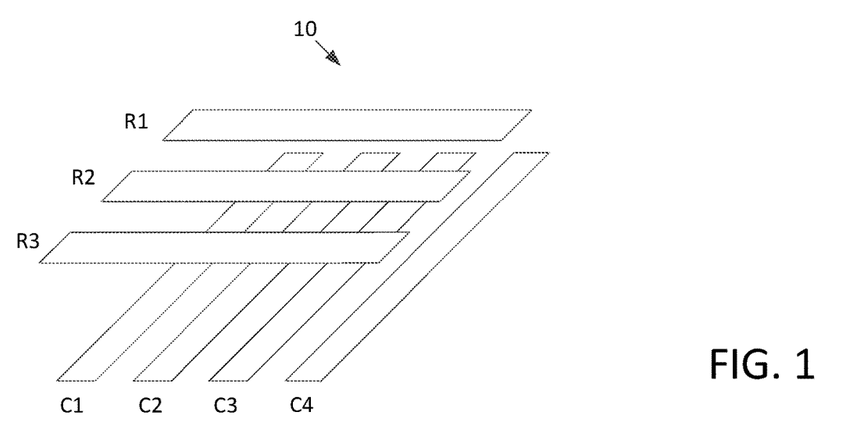
FIG. 1 is a perspective view of rows and columns of a mutual capacitance touch pressure sensor.

Reference is now made to FIG. 1 showing a portion of a capacitive touch matrix 10 comprising a plurality of conductive rows R1-R3 and plurality of conductive columns C1-C4. The conductive rows R1-R3 and the conductive columns C1-C4 cross above or below each other at intersection points, but are not in electrical contact with one another. Although the conductive rows R1-R3 and conductive columns C1-C4 are shown as having rectangular shapes and forming rectangular patterns, it should be appreciated that they may in some applications be shaped so as to form diamond shape patterns.

Figure 2:
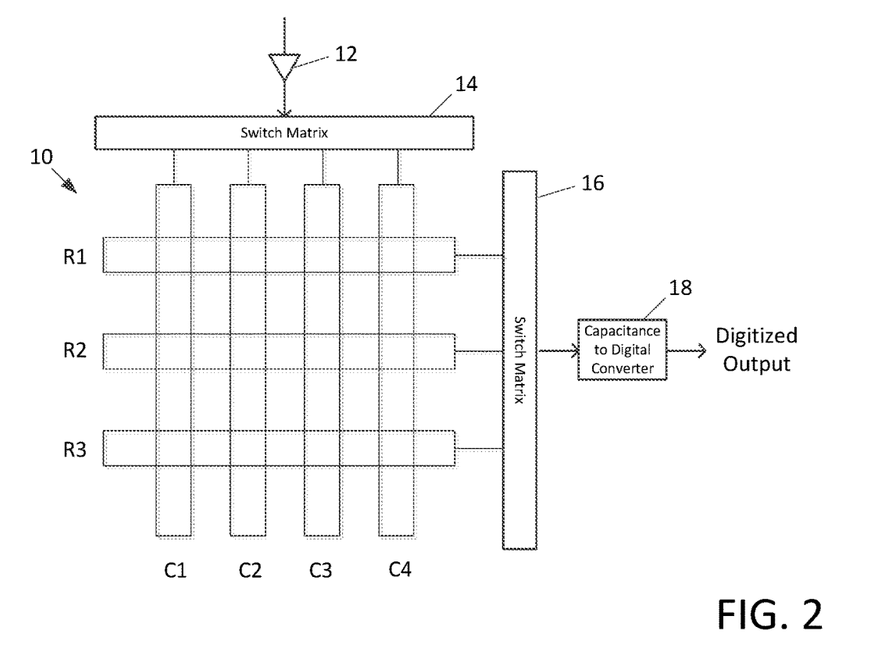
FIG. 2 is a block diagram of a mutual capacitance touch pressure sensor together with associated driving and sensing circuitry.

The capacitive touch matrix 10 may be used for either mutual capacitance sensing or for self-capacitance sensing. A mutual sensing embodiment of the capacitive touch matrix 10 is shown in FIG. 2, in which a column switch matrix 14 is coupled to the conductive columns C1-C4. A driver 12 is coupled to the column switch matrix 14, and serves to generate a time varying driving signal, which the column switch matrix 14 selectively applies in a sequential manner to each of the columns C1-C4.

A row switch matrix 16 sequentially selects one or more of the rows R1-R4 for connection to a capacitance-to-digital converter circuit 18 that operates to sense charge of the mutual capacitance between the selected row or rows R1-R3 and the driving column C1-C4, and to convert that charge to a digitized output indicating touch data.

This touch data can indicate a location of a touch, or a pressure of a touch. In the case where the capacitive touch matrix 10 is designed to measure the pressure of a touch, the rows R1-R3 are vertically spaced apart from the columns C1-C4 by a resilient dielectric (shown as element 33 in FIG. 5, which will be described below), such that pressure applied to the matrix from one direction serves to compress either the columns C1-C4 into the resilient dielectric or the rows R1-R3 into the resilient dielectric, thereby changing the distance between the rows R1-R3 and columns C1-C4. Changing the distance between the rows R1-R3 and columns C1-C4 changes the mutual capacitances therebetween, and thus the touch data can indicate the pressure of a touch.

In the case where the capacitive touch matrix 10 is designed to measure the location of a touch, the function is as described above, except the capacitive touch matrix 10 is not constructed such that a touch easily compresses either the rows R1-R3 or columns C1-C4 into the resilient dielectric. Thus, in this case, the change in mutual capacitance results from the presence of a finger or stylus adjacent the capacitive touch matrix 10.

Figure 3:
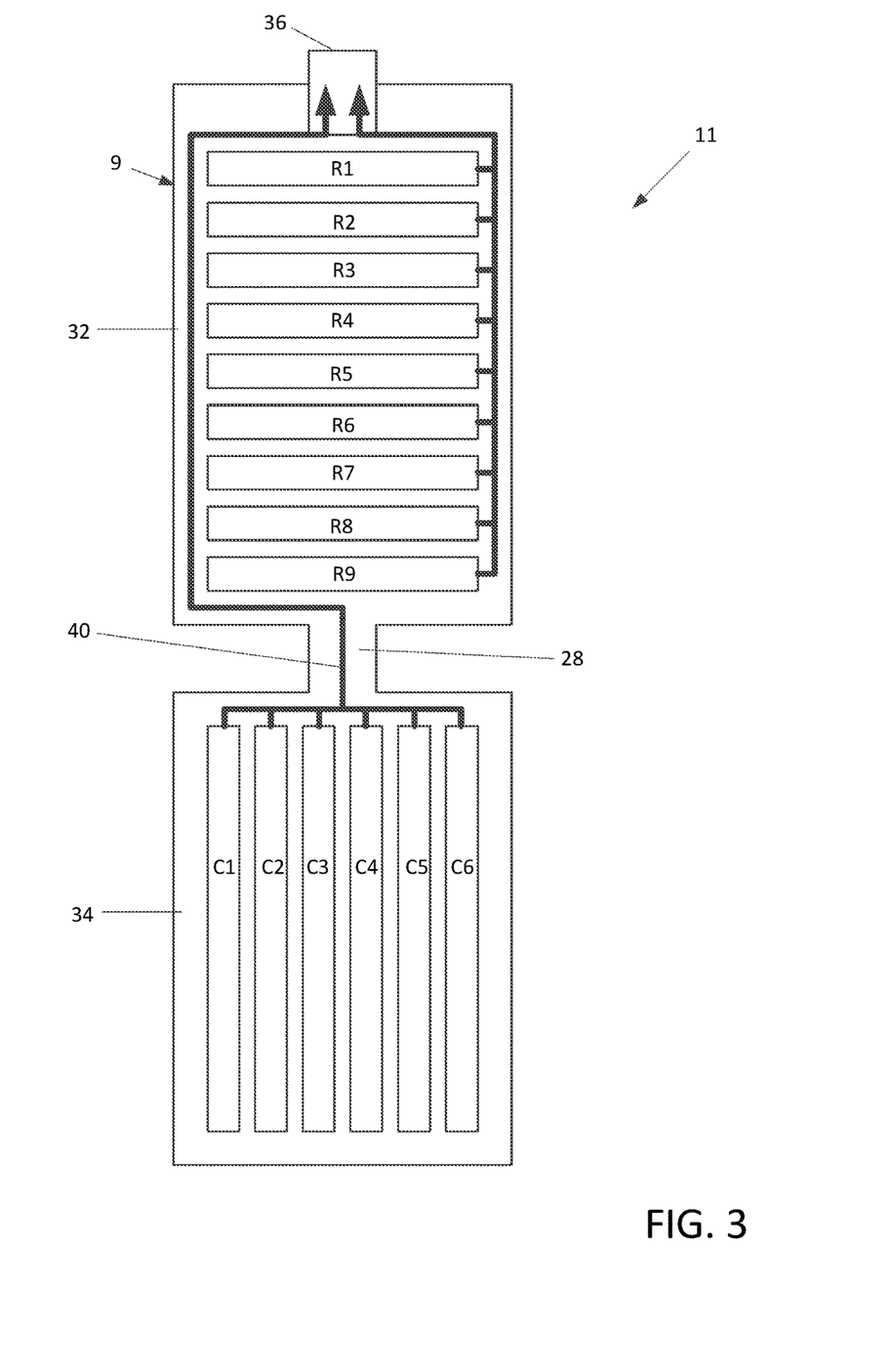
FIG. 3 is a top view of a mutual capacitance touch pressure sensor formed in accordance with this disclosure in which the mutual capacitance touch pressure sensor has not yet been folded.

Referring now to FIG. 3, a mutual capacitance touch pressure sensor 11 including a capacitive touch matrix 10 as discussed above is now described. As can be readily appreciated from the example illustrated in FIG. 5, the mutual capacitance touch pressure sensor 11 is laying flat and in an unfolded form, and becomes operative when folded (as will be explained below). The mutual capacitance touch pressure sensor 11 includes a flexible substrate 9 comprised of a first portion 34, a second portion 32, and an intermediate portion 28 that mechanically couples the first portion 34 to the second portion 32. The flexible substrate 9 is integrally formed as a monolithic unit, meaning it is a single continuous piece of material and was formed as such, and is not comprised of different pieces of material formed separately and then joined together.

The first portion 34 has conductive lines (columns) C1-C6 formed thereon, while the second portion 32 has conductive lines (rows) R1-R9 formed thereon. Although the columns C1-C6 and rows R1-R9 are shown as being in the form of straight linear shapes, they may take any suitable shaped, such as diamond patterns, if desired. Any numbers of columns and rows may be present, and the number of the columns C1-C6 and rows R1-R9 shown are merely for illustration. In a mutual capacitance sensing embodiment, the columns C1-C6 serve as sense lines, while the rows R1-R9 act as drive lines.

The first portion 34 and second portion 32 are generally rectangular in shape, with the first portion 34 having a lesser maximum length than the second portion 32. This lesser maximum length is so as to leave vertical space for the connector 36 (described in detail below) carried by the second portion 32. The intermediate portion 28 has a lesser maximum length and lesser maximum width than either the first portion 34 or the second portion 32, and is configured to permit folding so that the first portion 34 and second portion 32 can be arranged back-to-back or face-to-face (shown in FIG. 5, and described in detail below) such that the columns C1-C6 and rows R1-R9 are oriented so as to cross one another to thereby form the mutual capacitive touch pressure sensor 11 into an operative form capable of touch pressure sensing.

Conductive traces 40 (illustratively shown as one trace for simplicity, but in actuality multiple conductive traces) are coupled to the columns C1-C6 and run along a periphery of the first portion 34, through the intermediate portion 28, along a periphery of the second portion 32, and are electrically coupled to the connector 36. Conductive traces 42 (also illustratively shown as one trace for simplicity, but in actuality multiple conductive traces) are coupled to the rows R1-R9, run along the periphery of the second portion 32, and are electrically coupled to the connector 36.

The connector 36 itself is mechanically coupled to the second portion 32. While the connector 36 is electrically coupled to the columns C1-C6 and rows R1-R9, it does not electrically couple the columns C1-C6 to the rows R1-R9. It should also be appreciated that the connector 36 is a single, sole, unitary connector for the mutual capacitance touch pressure sensor 11, and that another connector is not coupled to the flexible substrate 9. This eliminates the need for additional connectors.

The first portion 34 is rectangular in shape having opposing sides and opposing ends, with the sides being longer than the ends. Similarly, the second portion 32 is rectangular in shape having opposing sides and opposing ends, with the sides being longer than the ends. As illustrated in FIG. 3, the connector 36 is attached to one end of the second portion 32, while the intermediate portion 28 attaches the other end of the second portion 32 to an end of the first portion 34.

Figure 4:
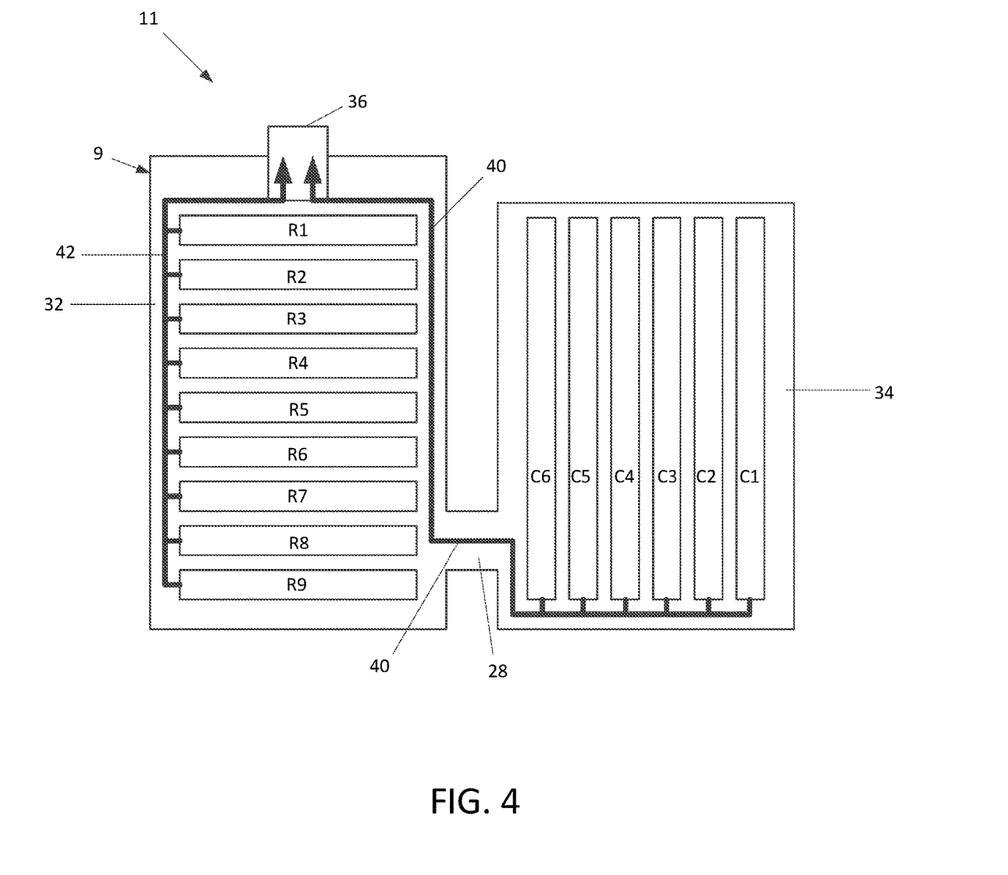
FIG. 4 is a top view of an alternative embodiment of a mutual capacitance touch pressure sensor formed in accordance with this disclosure in which the mutual capacitance touch pressure sensor has not yet been folded.

However, it should be appreciated that the connector 36 may be attached anywhere on the periphery of the second portion 32, and that the intermediate portion 28 may attach any portion of the periphery of the second portion 32 to a corresponding portion of the periphery of the first portion 34. For example, as illustrated in FIG. 4, the intermediate portion 28 attaches adjacent sides of the first portion 34 and second portion 32 to one another.

In addition, it should be appreciated that the connector 36 may instead be mechanically attached anywhere on the periphery of the first portion 34, and that the conductive traces 42 of the second portion 32 may run about the periphery of the second portion 32, through the intermediate portion 28, about the periphery of the first portion 34, and to the connector 36 at its location on the periphery of the first portion 34.

Also, although the first portion 34 and second portion 32 are shown as being generally rectangular, they make take any desired and suitable shape, such as a square, circle, ovoid, etc. Where the first portion 34 and second portion 32 each take a circle or ovoid shape, together with the rectangular intermediate section 28 they may form a barbell shape.

Figure 5:
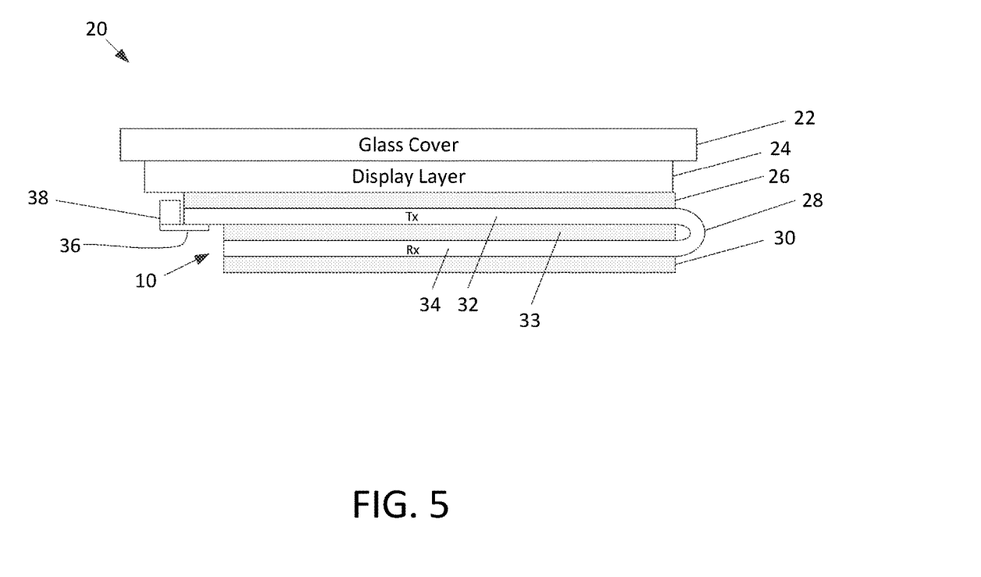
FIG. 5 is a side view of a touch screen including a mutual capacitance touch pressure sensor formed in accordance with this disclosure in which the mutual capacitance touch pressure sensor has been folded about an end thereof.

As explained, the flexible substrate 9 may be bent about the intermediate portion 28. This configuration is shown in FIG. 5. Here, the flexible substrate 9 is bent so that the face of the first portion 34 opposes the face of the second portion 32, with the intermediate portion 28 forming a U-shape connecting the first portion 34 to the second portion 32.

As shown, with respect to the top and bottom of the drawing figure itself, the second portion 32 is above the first portion 34, and a resilient dielectric layer 33 is positioned therebetween. A cushioning layer 26 is disposed on the opposite face of the second portion 32, and carries a display layer 24. A glass cover 22 is disposed on the face of the display layer 24 to protect the display layer. Another cushioning layer 30 is disposed on the bottom face of the first portion 34, and serves to protect that bottom face. A touch screen integrated circuit 38 couples with the connector 36 to pass signals thereto and receive signals therefrom.

In operation, a user touches the glass cover 22 in a fashion that applies force thereto. The glass cover 22 in turn bends, pushing into the cushioning layer 26, which in turn pushes the second portion 32 into the resilient dielectric layer 33. This changes the distance between the second portion 32 and the first portion 34, thereby changing the mutual capacitances therebetween. The touch screen integrated circuit 38 reads these capacitances and generates touch pressure data therefrom.

Although a mutual capacitance sensing mode of operation has been described above, it should be understood that the flexible substrate 9 may include a ground plane and that a self capacitance mode of operation may instead be performed.

Figure 6:
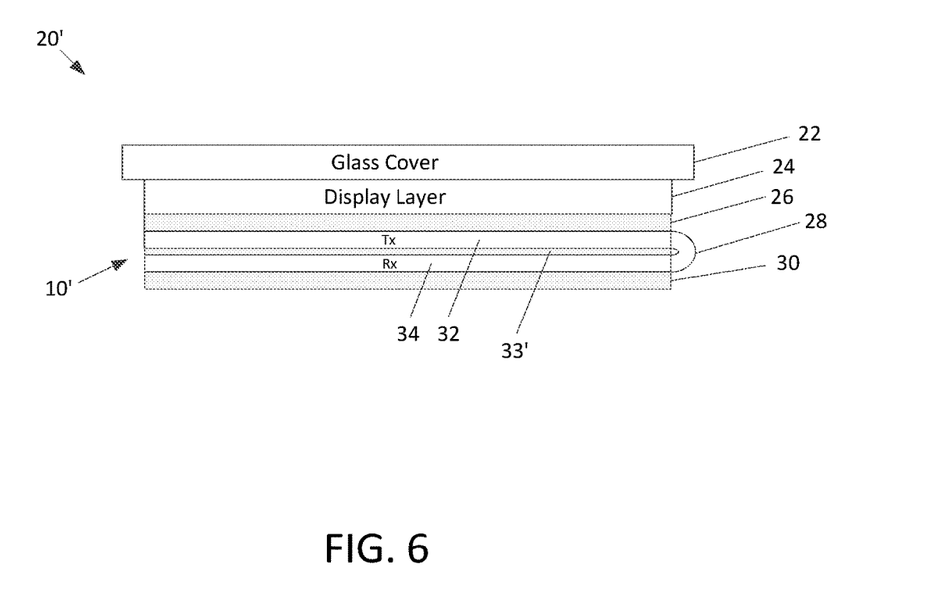
FIG. 6 is a side view of a touch screen including a mutual capacitance touch location sensor formed in accordance with this disclosure in which the mutual capacitance touch pressure sensor has been folded about a side thereof.

Also, although a touch pressure sensing operation has been performed, by selecting a different material for the layer 33 that is less resilient and more rigid, a touch location sensing operation may instead be performed. Such an embodiment is shown in FIG. 6, in which the dielectric layer 33' is thinner and less resilient than the resilient dielectric layer 33 described above. Also, as shown, the intermediate portion 28 is located on sides rather than ends of the first and second portions 32 and 34.

Although, as shown, the first portion 34 and second portion 32 are precisely aligned when folded about the intermediate portion 28, this may not be the case in some applications. For example, where the rows R1-R9 and columns C1-C6 are rectangular in shape and form rectangular patterns, it may be desirable for the first portion 34 and second portion 32 to be precisely aligned, but where either the rows R1-R9 or the columns C1-C6 are diamond shaped and form diamond shaped patterns, precise alignment between the first portion 34 and section portion 32 may be of lesser desire.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a flexible substrate comprising:
a first portion having a plurality of first conductive lines formed thereon;
a second portion having a plurality of second conductive lines formed thereon;
an intermediate portion mechanically coupling the first portion to the second portion;
wherein the intermediate portion is configured to permit folding so that the first and second portions can be arranged back-to-back or face-to-face such that plurality of the second conductive lines and plurality of first conductive lines are oriented so as to cross one another to thereby form a capacitive sensing panel;
a single connector mechanically coupled to the second portion, and electrically coupled to the first portion and the second portion via at least first and second traces but not electrically coupling the first portion to the second portion;
wherein the first trace is coupled to at least one of the plurality of first conductive lines and runs through the intermediate portion, through the second portion adjacent a first edge of the second portion and not adjacent to a second edge of the second portion opposite the first edge, and to the single connector;
wherein no trace coupled to at least one of the plurality of first conductive lines runs through the second portion adjacent to the second edge of the second portion;
wherein the second trace is coupled to at least one of the plurality of second conductive lines and runs through the second portion adjacent the second edge of the second portion and not adjacent the first edge of the second portion, and to the single connector;
wherein no trace coupled to at least one of the plurality of second conductive lines runs through the second portion adjacent the first edge of the second portion; and
wherein no other connectors are coupled to the flexible substrate.

2. The electronic device of claim 1, wherein the intermediate portion has a maximum width less than a maximum width of the first portion and the second portion.

3. The electronic device of claim 1, wherein the first portion has a rectangular shape with sides and ends, the sides of the first portion being longer than the ends of the first portion; wherein the second portion has a rectangular shape with sides and ends, the sides of the second portion being longer than the ends of the second portion; wherein the first edge of the second portion is at one of the sides or ends thereof; and wherein the second edge of the second portion is at an opposite one of the sides or ends.

4. The electronic device of claim 3, wherein the intermediate portion mechanically couples an end of the first portion to an end of the second portion.

5. The electronic device of claim 3, wherein the intermediate portion mechanically couples a side of the first portion to a side of the second portion.

6. The electronic device of claim 1, wherein the flexible substrate is integrally formed as a monolithic unit.

7. The electronic device of claim 1, further comprising a touch controller integrated circuit coupled to the single connector.

8. A capacitive touch pressure sensor, comprising:
a flexible substrate comprising:
a first portion having a plurality of sense lines formed on a top face thereof;
a second portion having a plurality of drive lines formed on a bottom face thereof;
an intermediate portion mechanically coupling the first portion to the second portion;
wherein the intermediate portion is U-shaped such that the bottom face of the second portion is opposed from the top face of the first portion;
a resilient layer disposed between the first portion and the second portion such that pressure applied to the second portion compresses the plurality of drive lines, thereby changing a distance between the plurality of drive lines and the plurality of sense lines;
a connector mechanically coupled to the second portion, and electrically coupled to the plurality of sense lines and plurality of drive lines via at least first and second traces but not electrically coupling the plurality of sense lines to the plurality of drive lines;
wherein the first trace is coupled to at least one of the plurality of sense lines and runs through the intermediate portion, through the second portion adjacent a first edge of the second portion and not adjacent to a second edge of the second portion opposite the first edge, and to the connector;
wherein no trace coupled to at least one of the plurality of sense lines runs through the second portion adjacent to the second edge of the second portion;
wherein the second trace is coupled to at least one of the plurality of drive lines and runs through the second portion adjacent the second edge of the second portion and not adjacent the first edge of the second portion, and to the connector; and
wherein no trace coupled to at least one of the plurality of drive lines runs through the second portion adjacent the first edge of the second portion.

9. The capacitive touch pressure sensor of claim 8, wherein no other connectors are mechanically coupled to the flexible substrate.

10. The capacitive touch pressure sensor of claim 8, further comprising a touch controller integrated circuit coupled to the connector and configured to apply a driving signal to the plurality of drive lines, to sense changes in capacitances between intersections of the plurality of drive line and plurality of sense lines by measuring charge on the plurality of sense lines, and to determine the pressure applied to the second portion as a function of the changes in the capacitances.

11. The capacitive touch pressure sensor of claim 8, wherein the intermediate portion has a maximum width less than a maximum width of the first portion and the second portion.

12. The capacitive touch pressure sensor of claim 8, wherein the first portion has a rectangular shape with sides and ends, the sides of the first portion being longer than the ends of the first portion; wherein the second portion has a rectangular shape with sides and ends, the sides of the second portion being longer than the ends of the second portion; wherein the intermediate portion mechanically couples an end of the first portion to an end of the second portion; wherein the first edge of the second portion is at one of the sides or ends thereof; and wherein the second edge of the second portion is at an opposite one of the sides or ends.

13. The capacitive touch pressure sensor of claim 8, wherein the first portion has a rectangular shape with sides and ends, the sides of the first portion being longer than the ends of the first portion; wherein the second portion has a rectangular shape with sides and ends, the sides of the second portion being longer than the ends of the second portion; and wherein the intermediate portion mechanically couples a side of the first portion to a side of the second portion; and wherein the first edge of the second portion is at one of the sides or ends thereof; and wherein the second edge of the second portion is at an opposite one of the sides or ends.

14. The capacitive touch pressure sensor of claim 8, wherein the flexible substrate is integrally formed as a monolithic unit.

15. A method, comprising:
providing a flexible substrate having a first portion, a second portion, and an intermediate portion connecting the first portion to the second portion;
disposing a plurality of sense lines on the first portion;
disposing at least a first trace on the first portion coupled to the plurality of sense lines, wherein the first trace is coupled to at least one of the plurality of sense lines and runs through the intermediate portion, through the second portion adjacent a first edge of the second portion and not adjacent to a second edge of the second portion opposite the first edge, and to a single connector, wherein no trace coupled to at least one of the plurality of sense lines runs through the second portion adjacent to the second edge of the second portion;
disposing a plurality of drive lines on a second portion of the flexible substrate;
disposing at least a second trace on the second portion coupled to the plurality of drive lines, wherein the second trace is coupled to at least one of the plurality of drive lines and runs through the second portion adjacent the second edge of the second portion and not adjacent the first edge of the second portion, and to the single connector, wherein no trace coupled to at least one of the plurality of drive lines runs through the second portion adjacent the first edge of the second portion;
mechanically connecting the single connector to the first portion or the second portion, and electrically coupling the single connector to the plurality of drive lines via at least the first and second traces, but not electrically coupling the plurality of drive lines to the plurality of sense lines;
disposing a resilient layer on the flexible substrate; and
bending the flexible substrate about the intermediate portion such that the plurality of drive lines face the plurality of sense lines but are separated therefrom by the resilient layer.

16. The method of claim 15, further comprising electrically coupling a touch controller integrated circuit to the single connector, and configuring the touch controller integrated circuit to apply a driving signal to the plurality of drive lines, to sense changes in capacitances between intersections of the plurality of drive line and plurality of sense lines by measuring charge on the plurality of sense lines, the changes in capacitance resulting from pressure applied to the second portion compressing the resilient layer and changing a distance between the plurality of sense lines and the plurality of drive lines.

17. A capacitive sensor, comprising:
  a flexible substrate comprising:
    a first portion having a plurality of sense lines formed on a top face thereof;
    a second portion having a plurality of drive lines formed on a bottom face thereof;
    an intermediate portion mechanically coupling the first portion to the second portion;
    wherein the intermediate portion is U-shaped such that the bottom face of the second portion is opposed from the top face of the first portion;
    a dielectric layer disposed between the first portion and the second portion;
  a connector mechanically coupled to the second portion, and electrically coupled to the plurality of sense lines and plurality of drive lines via at least first and second traces respectively but not electrically coupling the plurality of sense lines to the plurality of drive lines;
  wherein the first trace is coupled to at least one of the plurality of sense lines and runs through the intermediate portion, through the second portion adjacent a first edge of the second portion and not adjacent to a second edge of the second portion opposite the first edge, and to the connector;
  wherein no trace coupled to at least one of the plurality of sense lines runs through the second portion adjacent to the second edge of the second portion;
  wherein the second trace is coupled to at least one of the plurality of drive lines and runs through the second portion adjacent the second edge of the second portion and not adjacent the first edge of the second portion, and to the connector; and
  wherein no trace coupled to at least one of the plurality of drive lines runs through the second portion adjacent the first edge of the second portion.

18. The capacitive sensor of claim 17, wherein no other connectors are mechanically coupled to the flexible substrate.

19. The capacitive sensor of claim 17, further comprising a touch controller integrated circuit coupled to the connector and configured to apply a driving signal to the plurality of drive lines, to sense changes in capacitances between intersections of the plurality of drive line and plurality of sense lines by measuring charge on the plurality of sense lines, and to determine a pressure applied to the second portion as a function of the changes in the capacitances.

* * * * *